Patented Oct. 4, 1932

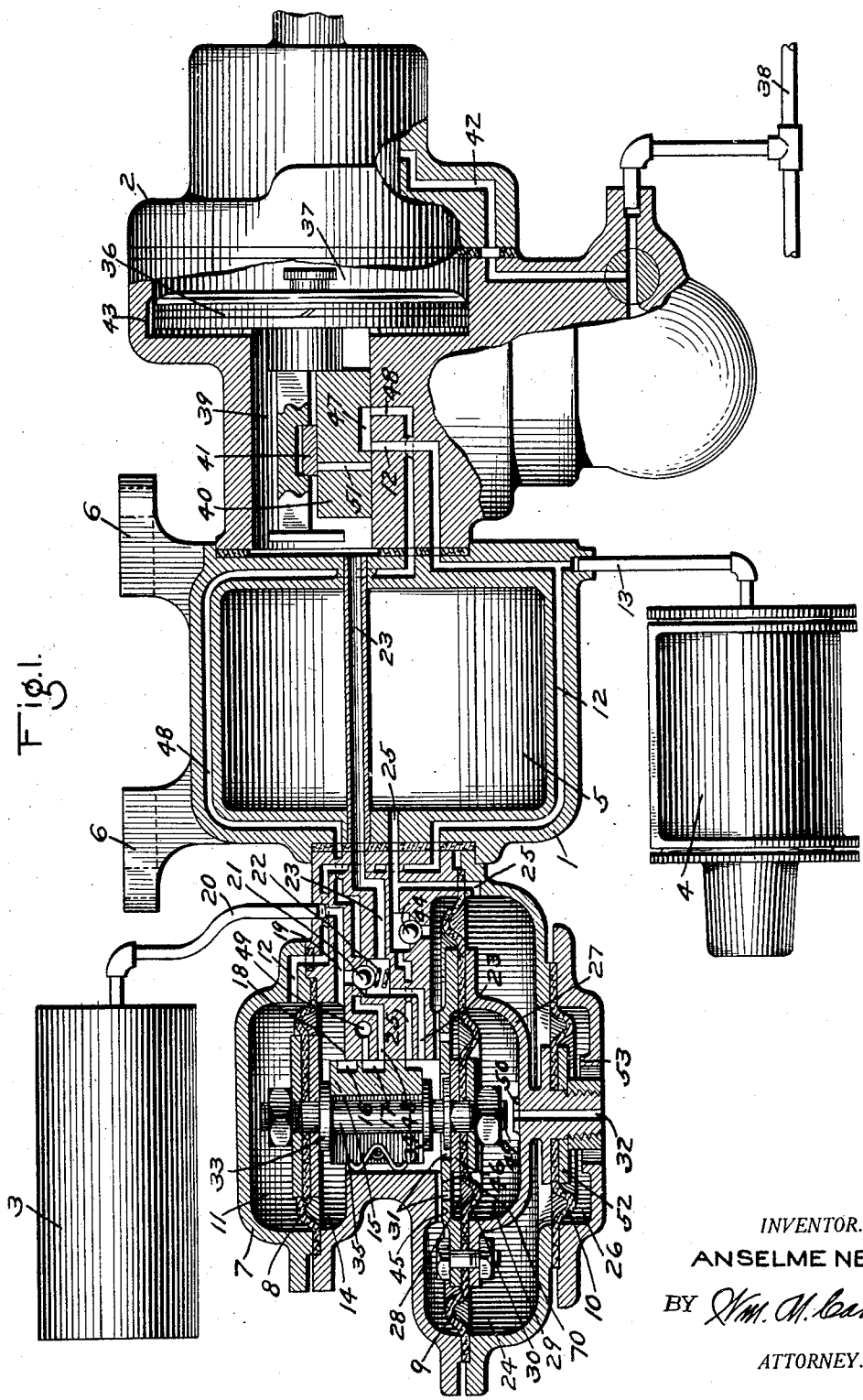

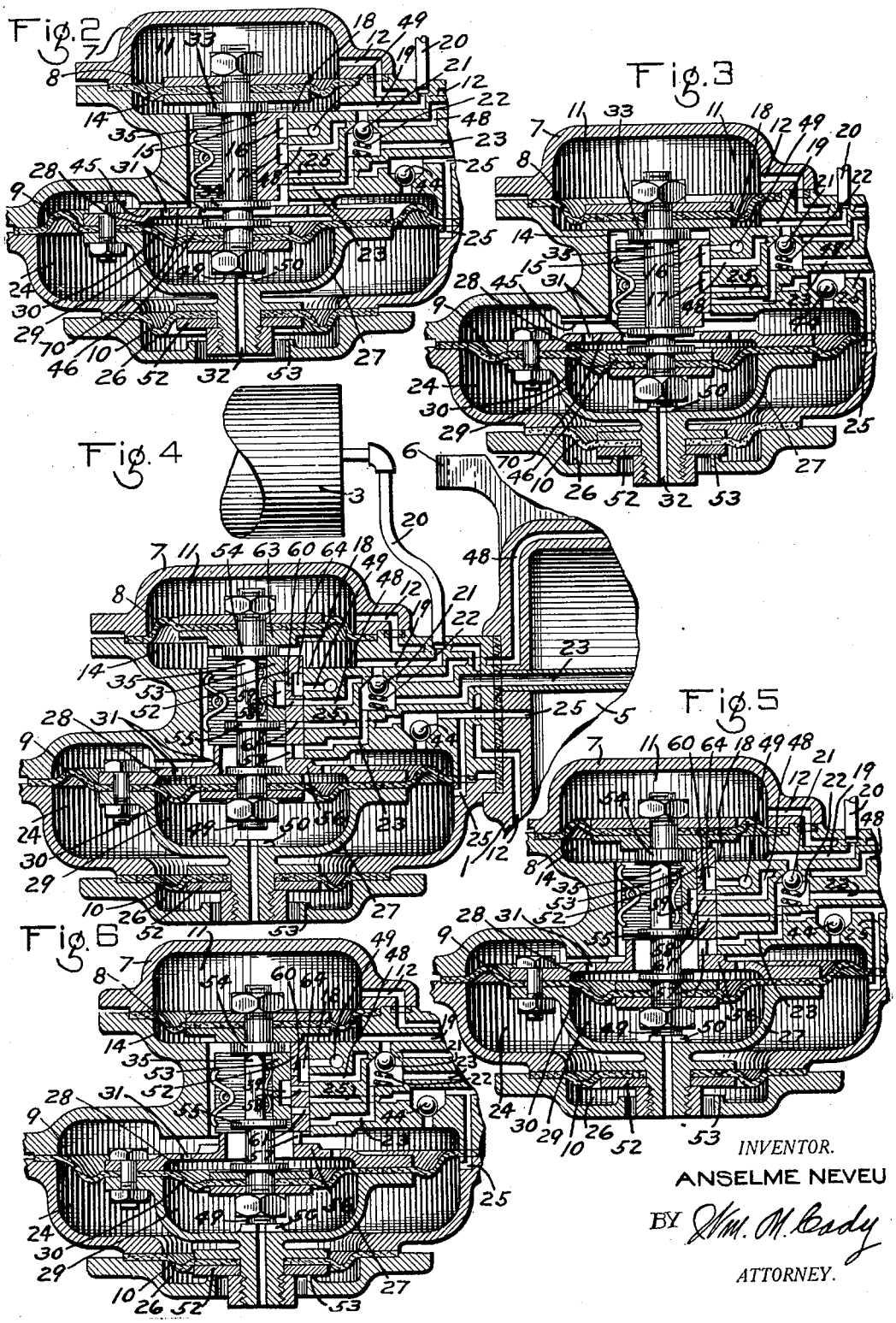

1,881,221

UNITED STATES PATENT OFFICE

ANSELME NEVEU, OF LIVRY-GARGAN, FRANCE, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed September 18, 1930, Serial No. 482,782, and in Great Britain November 25, 1929.

This invention relates to fluid pressure brake equipment of the type comprising a triple valve device or distributing valve device for controlling the supply of fluid under pressure to and its release from the brake cylinder in accordance with variations in train pipe pressure.

One object of the invention is to provide an improved form of graduated release valve device which is adapted to be readily combined with any form of device of the character above indicated, so as to enable graduated release of the brakes to be obtained without alteration in the construction or general mode or operation of the triple valve.

Another object of the invention is to provide a form of graduated release valve device in which the brake cylinder pressure is accurately reduced in proportion to the degree of restoration of train pipe pressure.

A further object of my invention is to provide an improved form of graduated valve device which, when the brake cylinder pressure is reduced to a predetermined low degree in releasing, moves to release position, so as to ensure complete venting of fluid under pressure from the brake cylinder to the atmosphere.

The improved graduated release valve device comprises a control chamber which is adapted to be maintained at normal train pipe pressure, the pressure in this chamber being cooperative with the pressures in the auxiliary reservoir and in the brake cylinder to control the release of fluid under pressure from the brake cylinder during graduated release, these pressures acting upon diaphragms or other abutments adapted to operate a valve element for this purpose.

According to the principal feature of the invention, the valve element is so constructed and arranged as to be capable of a further movement to that required for the graduation of the release, this further movement occurring when the brake cylinder pressure is reduced to a predetermined low degree, and being adapted to connect the brake cylinder to the atmosphere and the auxiliary reservoir to the control chamber, and to maintain these connections while the train pipe is charged to normal pressure and the equipment is in release position.

According to a further feature of the invention, communication between the auxiliary reservoir and the triple valve device or distributing valve device is arranged to be controlled by a check valve adapted to permit flow of fluid from the auxiliary reservoir to the brake cylinder by way of the triple valve device while the charging of the auxiliary reservoir with fluid under pressure supplied through the triple valve device is effected through a separate path controlled by the graduated release valve device.

In the accompanying drawings; Figure 1 is a diagrammatic view, mainly in section, of a fluid pressure brake equipment embodying my invention; Fig. 2 is a diagrammatic view of a portion of the equipment of Fig. 1 shown in application position; Fig. 3 is a diagrammatic view of a portion of the equipment shown in Fig. 1 in graduated release position; Fig. 4 is a diagrammatic view, mainly in section, of a modified form of my invention; Fig. 5 is a portion of the modified form of my invention shown in application position; and Fig. 6 is a portion of the modified form of my invention shown in graduated release position.

As shown in the drawings, for the purpose of illustration, I have associated my graduated release valve device 1 with a triple valve device 2 of the usual well known type, an auxiliary reservoir 3 and a brake cylinder 4.

The graduated release valve device 1 comprises a control reservoir 5 provided with lugs 6 or their equivalent for enabling the reservoir to be mounted on the frame of the vehicle, the reservoir 5 supporting at one end the triple valve device 2 and at the opposite end a casing 7 containing the graduated release valve mechanism.

The casing 7 is divided by spaced diaphragms 8, 9 and 10 into three chambers or compartments. The chamber 11 at the outer face of diaphragm 8 and hereinafter termed the brake cylinder chamber is permanently in communication with the brake cylinder 4 through a passage 12 and a pipe 13. The chamber 14 formed between diaphragms 8 and 9 contains a slide valve 15 provided with cavities 16 and 17 and adapted to cooperate with a valve seat 18 provided with ports as will be hereinafter described. The chamber 14 is permanently in communication with the auxiliary reservoir 3 through passage 19 and pipe 20 and also communicates through a check valve 21, provided with a light controlling spring 22, with a passage 23.

The control chamber 24, formed between diaphragms 9 and 10, is permanently in communication through a suitable passage 25 with the control reservoir 5 and the opposite side of the diaphragm 10 is at all times subject to atmospheric pressure in chamber 26. The diaphragm 10 is mechanically connected to the diaphragm 9 by a box or cage 27, one side of which is secured to the diaphragm 10, the opposite side of the box 27 being secured to the diaphragm 9, separating the chamber 14 from the control chamber 24.

The box 27 is itself divided internally into two chambers 28 and 29 by a diaphragm 30, the chamber 28 being in open communication with the chamber 14 through ports 31, while the chamber 29 is in open communication with the atmosphere through a port 32.

The slide valve 15 is mounted between two shoulders 33 and 34 on a stem 35 which operatively connects diaphragms 8 and 30 together, and it will be evident that under certain conditions said slide valve is capable of being moved by said diaphragms through a limited range of travel determined by the travel of diaphragm 30 within the box 27. The box being carried by diaphragms 9 and 10 is also capable of movement and under certain conditions is adapted to operate said slide valve, at which time the mechanism will move as a unit, as will be hereinafter more fully described.

The triple valve device is of the usual well known type comprising a casing containing a piston 36 having a chamber 37 at one side connected to a train pipe 38 through a passage 42 and a chamber 39 at the opposite side containing a main slide valve 40 and an auxiliary slide valve 41 adapted to be operated by said piston, the valve chamber 39 being in communication with the auxiliary reservoir 3 through the graduated release valve mechanism 1 by way of passage 23.

In operation, fluid under pressure is supplied to the train pipe 38 in the usual well known manner and from thence flows through passage 42 to chamber 37 of the triple valve device 2. With the triple valve device in release position, as shown in the drawings, fluid under pressure flows from chamber 37 through feed groove 43 to the slide valve chamber 39 and from thence through passage 23 to the seat of the graduating slide valve 15. In initially charging the equipment, the graduated release device is in the position shown in Fig. 2 of the drawings, in which position, passage 23 is uncovered by slide valve 15, so that fluid under pressure is permitted to flow from passage 23 to diaphragm chamber 14 and from thence through passage 19 and pipe 20 to the auxiliary reservoir 3, thus charging said reservoir to train pipe pressure. At the same time, fluid under pressure flows from valve chamber 14 past a check valve 44 and through passage 25 to the control reservoir 5 and to the control chamber 24, and through ports 31 to diaphragm chamber 28 in the box 27.

The fluid pressures thus obtained in diaphragm chambers 14, 24 and 28 are substantially equal, whereas the diaphragm chambers 26 and 29 remain at atmospheric pressure, due to their direct connection to the atmosphere. The diaphragm 8 is of larger area however than the diaphragm 30 and in initially charging the equipment, the pressure of fluid in chamber 14 acting on the diaphragm 8 over-balances the opposing pressure acting on diaphragm 30 and causes said diaphragms to be deflected upwardly to a position in which a follower plate 46 on diaphragm 30 engages the upper side of the box 27 as shown in the drawings. With the diaphragm 30 thus moved by diaphragm 8, the diaphragm 9 is relieved of the downwardly acting pressure of diaphragm 30, and the upwardly acting pressure of fluid in chamber 24 on diaphragm 9 over-balances the downwardly acting pressure of fluid in chamber 24 on diaphragm 10 plus the downwardly acting pressure of fluid in chamber 14 on diaphragm 9 outside of the area of diaphragm 30. The diaphragm 9 is thus deflected upwardly and operates through the box 27 to deflect diaphragm 10 upwardly until the upper surfaces of the box 27 engages a stop 45 in the casing. As the box 27 thus moves upwardly, the diaphragm 8 also moves slide valve 15 upwardly and maintains the follower plate 46 of diaphragm 30 in engagement with said box. In this position of the diaphragms 8, 9, 10 and 30 and slide valve 15, and with the triple valve device 2 in release position, the brake cylinder 4 is open to the atmosphere through pipe 13, passage 12, a cavity 47 in the triple valve slide valve 40, passage 48 connecting the triple valve exhaust to the graduated release device, cavity 17 in the graduated release slide valve 15 and atmospheric port 49. Diaphragm chamber 11 of the graduated release device being connected through passage 12 and pipe 13 to the brake cylinder 4 is also opened to the atmosphere.

With the diaphragm chambers 14, 24 and 28 of the graduated release device charged with fluid at auxiliary reservoir pressure in the manner hereinbefore described and the chamber 11 at atmospheric pressure, the graduated release device is held in the position shown in the drawings, in which the control reservoir charging port 25 is uncovered by the slide valve 15, so as to permit free communication between the control reservoir 5 and the diaphragm chamber 14 and thus ensure complete charging of the control reservoir 5.

To effect an application of the brakes, the pressure of fluid in train pipe 38 is reduced and a corresponding reduction in pressure occurs in piston chamber 37 of the triple valve device 2. The pressure of fluid in valve chamber 39 then shifts the triple valve piston 36 and slide valves 40 and 41 to application position in which fluid under pressure is permitted to flow from the auxiliary reservoir 3 to the brake cylinder 4 through pipe 20, passage 19, graduated release valve chamber 14, passage 23, triple valve chamber 39, port 51 in the triple valve slide valve 40, passage 12 and pipe 13. At the same time fluid at brake cylinder pressure flows to diaphragm chamber 11 of the graduated release valve device and exerts a downwardly acting pressure on diaphragm 8. Diaphragm chamber 14 being in communication with the auxiliary reservoir, the pressure of fluid therein is reduced when the brakes are applied. This reduces the differential of pressures acting upon the adjacent faces of diaphragms 8 and 30 and tending to hold the slide valve 15 in the position shown in Fig. 1 of the drawings, and permits the pressure obtained in diaphragm chamber 11 to deflect the diaphragm 8 downwardly, and thus deflect diaphragm 30 and move slide valve 15 to application position shown in Fig. 2, in which position the end 49 of the diaphragm stem 35 engages the stop 50 in the box 27. The movement of the slide valve 15 to application position laps the control reservoir, charging passage 25, thereby bottling up the control reservoir 5 and diaphragm chamber 24, so as to hold a constant pressure in said chamber while the brakes are applied.

When the end 49 of the diaphragm stem 35 engages stop 50 in the box 27, there is a tendency to move said box downwardly. However, when the brakes are being applied this does not occur, since the pressure bottled in diaphragm chamber 24 and acting on diaphragm 9 is sufficient to over-balance the opposing reduced auxiliary reservoir pressure in diaphragm chamber 14, plus the pressure of the diaphragm stem 35 on the box 27. Thus, while the brakes are applied, the graduated release device remains in the application position shown in Fig. 2 of the drawings.

When it is desired to release after an application of the brakes, fluid under pressure is supplied to the train pipe 38 in the usual manner and flows therefrom to piston chamber 37 of the triple valve device and builds up a pressure on the piston 36. The piston 36 is thereby moved to release position and in so moving shifts the slide valves 40 and 41 to release position in which the exhaust cavity 47 in slide valve 40 connects the brake cylinder passage 12 to passage 48 leading to the seat of the graduating slide valve 15, where said passage is lapped by the slide valve 15 in application position, as shown in Fig. 2.

Fluid under pressure supplied to the triple valve piston chamber 37 flows therefrom through feed groove 43 to valve chamber 39 and from thence through passage 23 to the diaphragm chamber 14 and from said chamber through passage 19 and pipe 20 to the auxiliary reservoir 3, thus increasing the pressure in said chamber and reservoir. As the pressure of fluid is thus increased in diaphragm chamber 14, said pressure acting on diaphragm 9 plus the difference in pressures acting on diaphragms 8 and 30 and exerting a downwardly acting pressure through the diaphragm stem 35 on the lower side of the box 27, eventually deflects the diaphragm 9 downwardly until the follower 52 of diaphragm 10 engages a stop 53 on the casing. Since the box 27 moves downwardly with the deflection of diaphragm 9 and the difference in pressures acting on diaphragms 8 and 30 is in a downwardly direction, the diaphragm stem 35 is maintained in engagement with stop 50 in the box 27 and causes the slide valve 15 to move to graduated release position as shown in Fig. 3.

In graduated release position of the slide valve 15, passage 23 is lapped by said slide valve, so as to prevent further flow of fluid under pressure from the triple valve chamber 39 to the diaphragm chamber 14 and the auxiliary reservoir 3, and at the same time, the brake cylinder passage 48 leading from the brake cylinder 4 through the triple valve slide valve 40 is connected to the atmospheric passage 49 through cavity 16 in the graduated release valve 15, which permits fluid under pressure to flow from the brake cylinder 4 to the atmosphere to effect a release of the brakes.

The diaphragm chamber 11 being connected to the brake cylinder passage 12, the pressure of fluid in said chamber reduces as the brake cylinder pressure reduces. When the brake cylinder pressure in chamber 11 is thus reduced an amount proportionate to the increase in auxiliary reservoir pressure, which is effective in diaphragm chamber 14, the auxiliary reservoir pressure acting on diaphragm 8 over-balances the opposing brake cylinder pressure acting on said diaphragm and the opposing auxiliary reservoir pressure acting on the diaphragm 30, and deflects diaphragm 8 upwardly to the position shown in Fig. 2 of the drawings. This movement of diaphragm 8 moves the diaphragm 30 and slide valve 15, so as to relieve the pressure of diaphragm stem 35 on the box 27 which permits control reservoir pressure in chamber 24, which is greater than the reduced auxiliary reservoir pressure in chamber 14, to deflect diaphragm 9 upwardly until the diaphragm follower 70 engages the stop 45. In this position, the brake cylinder passage 48 is lapped by the slide valve 15, so as to prevent further venting of fluid from the brake cylinder 4, and the supply passage 23 is uncovered by the slide valve to permit further flow of fluid under pressure to the diaphragm chamber 14 and auxiliary reservoir 3. When the pressure of fluid in diaphragm chamber 14 and in the auxiliary reservoir 3 is then increased another predetermined amount, the graduated release device again operates to cut off the supply of fluid under pressure to the auxiliary reservoir and to vent fluid under pressure from the brake cylinder 4 in the same manner as hereinbefore described.

In the manner just described, the graduated release device operates to permit a predetermined increase in auxiliary reservoir pressure and then to effect a proportionate reduction in brake cylinder pressure, and this operation is alternately repeated upon increases in train pipe pressure, so that the brake cylinder pressure is reduced in steps which are proportionate to the degree of restoration of train pipe pressure.

It will be noted that in graduating the release of brakes as hereinbefore described, the diaphragms 8, 9 and 10 all operate together, and the diaphragm stem 35 is maintained in engagement with the stop 50 in the box 27 by the brake cylinder pressure in chamber 11 acting on diaphragm 8. However, when the brake cylinder pressure in chamber 11 becomes reduced to a low degree, such as for instance 7 pounds per square inch, the auxiliary reservoir pressure in chamber 14 acting on the diaphragm 8 overcomes the low brake cylinder pressure in chamber 11 and the auxiliary reservoir pressure acting on diaphragm 30 and deflects the diaphragm 8 upwardly which permits diaphragm 9 to deflect and move box 27 upwardly to the position shown in Fig. 1 of the drawings, and at the same time pulls the slide valve 15 and diaphragm 30 to the release position, in which position cavity 17 in said slide valve connects the brake cylinder passage 48 to the exhaust passage 49, so as to permit a complete venting of fluid under pressure from the brake cylinder 4. As the brake cylinder pressure is thus completely reduced, a further reduction in pressure occurs in diaphragm chamber 11 which increases the force holding the slide valve in this release position, so as to ensure the brakes remaining released and to permit a complete recharge of the auxiliary reservoir and control reservoir in the manner hereinbefore described.

It will be noted that the travel of slide valve 15 relative to box 27 is adapted to isolate the control reservoir when the brakes are applied, and in releasing the brakes, this relative travel serves to ensure a complete venting of fluid under pressure from the brake cylinder 4. This movement of the slide valve is governed by the auxiliary reservoir pressure and the brake cylinder pressure, so that if for any reason the control reservoir becomes overcharged and prevents downward deflection of diaphragm 9 and movement of box 27 for controlling the graduated release, a release of the brakes is still obtainable upon a substantial recharge of the auxiliary reservoir and chamber 14, since when the auxiliary reservoir pressure in chamber 14 is increased above the brake cylinder pressure in chamber 11, the diaphragm 8 will operate the slide valve 15 to release position to effect a release of the brakes.

The provision of the check valve 21 between the auxiliary reservoir 3 and the slide valve chamber 39 of the triple valve 2 enables the latter to function in its normal manner during an application of the brakes without any alteration in its construction.

The modified form of my invention shown in Figs. 4, 5 and 6 differs from the preferred form in having a main slide valve 52 disposed on the valve seat 18 and not movable by deflection of the diaphragm 8 when an application of the brakes is effected. An auxiliary slide valve 53 is mounted on the main slide valve 52 and is interposed between shoulders 54 and 55 on the stem 35 connecting the diaphragms 8 and 30 and is movable relative to slide valve 52. When the graduated release device is in release position, the follower plate 56 on diaphragm 9 is adapted to engage the valve seat 18 which provides a stop, said follower plate having an extension 57 for moving the slide valve 52.

In operation, when the graduated release device is in release position, the diaphragm chamber 14 and auxiliary reservoir 3 are charged with fluid under pressure, which flows through passage 23 and past the end of the main slide valve 52 to chamber 14 and from said chamber through passage 19 and pipe 20 to the auxiliary reservoir. The control reservoir 5 is also charged with fluid under pressure from valve chamber 14 by flow past the check valve 44. The pressure of fluid in chamber 14 deflects diaphragm 8 to release position in the same manner as hereinbefore described. This moves slide valve 53 relative to slide valve 52 to release position as shown in Fig. 4 of the drawings, in which position the brake cylinder 4 is connected to the atmosphere by way of the brake cylinder passage 48, port 58 in the main slide valve 52, cavity 59 in the auxiliary slide valve 53, port 60 and cavity 64 in the main slide valve and the atmospheric passage 49. In this position, a port 61 in the main slide valve 52 is uncovered by the auxiliary slide valve 53, which opens direct communication from the chamber 14 to passage 25 leading to the control reservoir 5 and diaphragm chamber 24.

When an application of the brakes is effected, the reduction in auxiliary reservoir pressure in chamber 14 and the build up of brake cylinder pressure in chamber 11 causes the diaphragm 8 to be deflected downwardly in the same manner as in the preferred construction. This deflection of diaphragm 8 moves the auxiliary slide valve 53 relative to the main slide valve 52 to application position as shown in Fig. 5 of the drawings. It will be noted that the main slide valve does not move, but the relative movement of the auxiliary slide valve shifts the position of cavity 59 so as to disconnect ports 58 and 60 and causes the control reservoir charging part 61 to be lapped, so as to isolate the control reservoir.

In moving to application position, the main slide valve 52 is not moved, but in said position the follower plate 63 at the lower side of diaphragm 8 just engages the main slide valve 52, so that upon an increase in auxiliary reservoir pressure in chamber 14, in releasing after an application of the brakes, both slide valves 52 and 53 are moved downwardly together to graduated release position shown in Fig. 6, this movement being effected in the same manner as in the preferred construction.

In graduated release position of the slide valves 52 and 53, passage 23 through which fluid under pressure is supplied to chamber 14 and the auxiliary reservoir is lapped by the main slide valve 53 and the brake cylinder passage 48 is connected through the cavity 64 in the main slide valve to the atmospheric port 49, so as to permit fluid under pressure to be vented from the brake cylinder. Upon a predetermined decrease in brake cylinder pressure in chamber 11, the two slide valves are moved together back to application position in which the pressure in chamber 14 is again increased. In this manner, the two slide valves 52 and 53 operate as one to control the recharging of chamber 14 and the auxiliary reservoir with fluid under pressure and to control the graduated release of fluid under pressure from the brake cylinder, and as in the case in the preferred construction, when the brake cylinder pressure is thus reduced to some predetermined low pressure, such as 7 pounds per square inch, the pressure in chamber 11 is so reduced as to permit auxiliary reservoir pressure in chamber 14 to deflect the diaphragm 8 upwardly. This partially unloads the diaphragm 9 and permits control reservoir pressure in chamber 24 to deflect said diaphragm upwardly and return the box 27 to release position as shown in Fig. 4. This movement of box 27 causes the follower plate extension 57 to engage and move the main slide valve 52 to release position, and permits the diaphragm 8 to move the auxiliary slide valve 53 relative to the main slide valve to release position in which position the brake cylinder passage 48 is again opened to the atmosphere through cavity 59 in the auxiliary slide valve, though which cavity the final release of fluid under pressure from the brake cylinder takes place.

The control reservoir and the graduated release valve need not necessarily be mounted as above described relative to the triple valve, but in cases in which the triple valve is separately arranged, it is only necessary to provide pipes leading to the graduated release valve device 1 from the auxiliary reservoir 3, the exhaust passage 48 of the triple valve device 2 and a branch pipe from the brake cylinder 4.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake cylinder and an auxiliary reservoir, of a graduated release valve device comprising valve means for controlling the supply of fluid under pressure to the auxiliary reservoir and the release of fluid under pressure from the brake cylinder and for permitting flow of fluid under pressure from the auxiliary reservoir to the brake cylinder, and movable abutments subject to variations in pressure in the brake cylinder and the auxiliary reservoir, and to a constant pressure for operating said valve means.

2. The combination with a brake cylinder and an auxiliary reservoir, of a graduated release device comprising valve means having two different positions for releasing fluid under pressure from the brake cylinder, and movable abutments subject to variations in auxiliary reservoir pressure and brake cylinder pressure, and to a constant pressure for operating said valve means.

3. The combination with a brake cylinder and an auxiliary reservoir, of a graduated release device comprising valve means having a position for releasing fluid under pressure from the brake cylinder, and another position for releasing fluid under pressure from the brake cylinder and for supplying fluid under pressure to the auxiliary reservoir, and movable abutments subject to variations in auxiliary reservoir pressure and brake cylinder pressure, and to a constant pressure for operating said valve means.

4. The combination with a brake cylinder and an auxiliary reservoir, of a graduated release device comprising valve means having a position for releasing fluid under pressure from the brake cylinder, another position for preventing the release of fluid under pressure from the brake cylinder and for supplying fluid under pressure to the auxiliary reservoir, and a third position for releasing fluid under pressure from the brake cylinder and for at the same time supplying fluid under pressure to the auxiliary reservoir, and movable abutments subject to variations in auxiliary reservoir pressure and brake cylinder pressure, and to a constant pressure for operating said valve means.

5. The combination with a brake cylinder, and an auxiliary reservoir, of a valve device subject to variations in brake cylinder pressure and auxiliary reservoir pressure, and to a constant pressure for graduating the release of fluid under pressure from said brake cylinder and for controlling the supply of fluid under pressure to said auxiliary reservoir, said valve device comprising valve means, movable, connected abutments for operating said valve means, and other movable connected abutments operative at one time for modifying the operation of the first mentioned abutments.

6. The combination with an auxiliary reservoir and a brake cylinder, of valve means movable to one position for supplying fluid under pressure to said auxiliary reservoir and to another position for venting fluid under pressure from said brake cylinder, a pair of connected abutments subject to variations in auxiliary reservoir pressure and brake cylinder pressure, and a control abutment subject to variations in auxiliary reservoir pressure and a constant pressure and cooperative with said pair of abutments for moving said valve means to said positions, said pair of abutments being operative relative to said control abutment for moving said valve means to a third position for venting fluid under pressure from said brake cylinder.

7. In a fluid pressure brake, the combination with an auxiliary reservoir, a control reservoir and a brake cylinder, of a valve having one position for releasing fluid under pressure from said brake cylinder and for supplying fluid under pressure to said reservoirs, a second position for supplying fluid under pressure to the auxiliary reservoir and a third position for releasing fluid under pressure from said brake cylinder in proportion to the amount of fluid under pressure supplied to the auxiliary reservoir in the second position, and a plurality of cooperating, movable abutments subject to variations in auxiliary reservoir pressure and brake cylinder pressure, and to control reservoir pressure for alternately moving said valve from the second to the third position and from the third to the second position, a pair of said abutments being operative relative to the other of said abutments when the pressure of fluid in the brake cylinder is reduced to a predetermined degree to move said valve to the first mentioned position.

8. In a fluid pressure brake, the combination with an auxiliary reservoir, a control reservoir and a brake cylinder, of a valve having one position for releasing fluid under pressure from said brake cylinder and for supplying fluid under pressure to said reservoirs, a second position for supplying fluid under pressure to the auxiliary reservoir and a third position for releasing fluid under pressure from said brake cylinder in proportion to the amount of fluid under pressure supplied to the auxiliary reservoir in the second position, a movable control abutment operative by variations in auxiliary reservoir pressure and the pressure in said control reservoir, a box carried by said abutment, another abutment subject to variations in auxiliary reservoir pressure and movably mounted in said box, a third abutment subject to variations in auxiliary reservoir pressure and brake cylinder pressure, and a stem connecting the last two mentioned abutments for moving said valve to the first mentioned position upon movement of the last two mentioned abutments relative to the control abutment, said control abutment being operative upon an increase in auxiliary reservoir pressure, when the brake cylinder is charged with fluid under pressure, to cooperate with the last two mentioned abutments for moving said valve to the second and third positions.

9. In a fluid pressure brake, the combination with an auxiliary reservoir, a control reservoir and a brake cylinder, of a valve having one position for releasing fluid under pressure from said brake cylinder and for supplying fluid under pressure to said reservoirs, a second position for supplying fluid under pressure to the auxiliary reservoir and a third position for releasing fluid under pressure from said brake cylinder in proportion to the amount of fluid under pressure supplied to the auxiliary reservoir in the second position, a pair of connected movable abutments subject to variations in auxiliary reservoir pressure and brake cylinder pressure for moving said valve to the first mentioned position, a box containing one of said pair of abutments, and a movable control abutment carrying said box and subject to variations in auxiliary reservoir pressure, and the pressure in said control reservoir for controlling the movement of said abutments and said valve to the two last mentioned positions.

10. In a fluid pressure brake, the combination with a brake cylinder, an auxiliary reservoir, and a control reservoir, of a main valve for controlling the supply of fluid under pressure to said auxiliary reservoir and for releasing fluid under pressure from said brake cylinder in proportion to the amount of fluid under pressure supplied to said auxiliary reservoir, an auxiliary valve associated with said main valve for controlling the supply of fluid under pressure to said control reservoir and for controlling the release of fluid under pressure from said brake cylinder, an abutment subject to variations in brake cylinder pressure and auxiliary reservoir pressure, an abutment subject to variations in auxiliary reservoir pressure, a stem connecting said abutments for moving said auxiliary valve relative to said main valve upon movement of said abutments, and a control abutment subject to variations in auxiliary reservoir pressure and the pressure in the control reservoir and cooperative with the first two mentioned abutments for moving said valves as one.

11. In a fluid pressure brake, the combination with a train pipe, an auxiliary reservoir, and a brake cylinder, of a valve device for controlling the supply of fluid under pressure to said auxiliary reservoir and the venting of fluid under pressure from said brake cylinder, valve means operative upon an increase in brake pipe pressure to supply fluid under pressure from said brake pipe through said valve device to said auxiliary reservoir, a passage connecting said auxiliary reservoir and said valve means, said valve means being operative upon a decrease in brake pipe pressure to permit flow of fluid from said auxiliary reservoir through said passage to said brake cylinder, and a check valve in said passage for preventing flow of fluid from said valve means to said auxiliary reservoir.

12. In a fluid pressure brake, the combination with a train pipe, an auxiliary reservoir, and a brake cylinder, of a graduated release valve device for controlling the supply of fluid under pressure to said auxiliary reservoir, and the venting of fluid under pressure from said brake cylinder, valve means operative upon an increase in brake pipe pressure to supply fluid under pressure from said brake pipe through said graduated release device to said auxiliary reservoir and upon a decrease in brake pipe pressure to permit fluid under pressure to flow from said auxiliary reservoir through said graduated release device to said brake cylinder, a passage by-passing said graduated release valve device for permitting fluid under pressure to flow from said auxiliary reservoir to said brake cylinder without flowing through said graduated release device, and a check valve in said passage for preventing back flow through said passage.

13. A valve device comprising a casing, a flexible diaphragm mounted in said casing, a secondary casing secured to said diaphragm and dividing the diaphragm into two portions, and a valve operated by the flexing of one portion of the diaphragm independently of the other portion.

14. A valve device comprising a casing, a flexible diaphragm mounted in said casing, a secondary casing secured to said diaphragm and dividing the diaphragm into an outer annular portion and an axial portion, and a valve operated by the flexing of the axial portion independently of the annular portion.

In testimony whereof I have hereunto set my hand.

ANSELME NEVEU.